(12) United States Patent
Dai et al.

(10) Patent No.: US 11,815,679 B2
(45) Date of Patent: Nov. 14, 2023

(54) METHOD, PROCESSING DEVICE, AND DISPLAY SYSTEM FOR INFORMATION DISPLAY

(71) Applicant: Industrial Technology Research Institute, Hsinchu (TW)

(72) Inventors: Hong-Ming Dai, Tainan (TW); Tzu-Yi Yu, Kaohsiung (TW); Chien-Ju Lee, Taoyuan (TW); Yu-Hsiang Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/551,197

(22) Filed: Dec. 15, 2021

(65) Prior Publication Data

US 2022/0334388 A1 Oct. 20, 2022

Related U.S. Application Data

(60) Provisional application No. 63/175,569, filed on Apr. 16, 2021.

(51) Int. Cl.
*G02B 27/01* (2006.01)
*G06F 3/01* (2006.01)
(Continued)

(52) U.S. Cl.
CPC ............ *G02B 27/0101* (2013.01); *B60R 1/28* (2022.01); *G02B 27/0093* (2013.01);
(Continued)

(58) Field of Classification Search
CPC ............ G02B 27/0101; G02B 27/0093; G02B 2027/0138; G02B 2027/014; B60R 1/28;
(Continued)

(56) References Cited

U.S. PATENT DOCUMENTS 9,470,891 B2 10/2016 Andersson et al.
10,104,298 B2 10/2018 Wierich
(Continued)

FOREIGN PATENT DOCUMENTS

CN 103217169 7/2013
CN 105929539 9/2016
(Continued)

OTHER PUBLICATIONS

"Office Action of Taiwan Counterpart Application", dated Jul. 5, 2022, p. 1-p. 6.

*Primary Examiner* — Ibrahim A Khan
(74) *Attorney, Agent, or Firm* — JCIPRNET

(57) ABSTRACT

A method, a processing device, and a system for information display are proposed. The system may be disposed in a vehicle and includes a light transmissive display, at least one first information extraction device, at least one second information extraction device, and a processing device. The first information extraction device is configured to extract gaze information of a user in the vehicle. The second information extraction device is configured to extract scene information of a scene outside of the vehicle. The processing device is configured to compute a field of view of the user viewing the scene outside of the vehicle through the display according to the gaze information and the scene information, generate display information according to the field of view of the user, and display the display information on the display.

17 Claims, 9 Drawing Sheets

(51) Int. Cl.
*G06F 3/14* (2006.01)
*G06V 20/56* (2022.01)
*G06T 7/70* (2017.01)
*G02B 27/00* (2006.01)
*B60R 1/28* (2022.01)
*G06T 7/60* (2017.01)

(52) U.S. Cl.
CPC ............ *G06F 3/013* (2013.01); *G06F 3/1423* (2013.01); *G06T 7/60* (2013.01); *G06T 7/70* (2017.01); *G06V 20/56* (2022.01); *G02B 2027/014* (2013.01); *G02B 2027/0138* (2013.01); *G06T 2207/30252* (2013.01); *G06T 2207/30268* (2013.01)

(58) Field of Classification Search
CPC ......... G06F 3/013; G06F 3/1423; G06T 7/60; G06T 7/70; G06T 2207/30252; G06T 2207/30268; G06V 20/56
See application file for complete search history.

(56) References Cited

U.S. PATENT DOCUMENTS

| | | | | |
|---|---|---|---|---|
| 10,116,873 | B1* | 10/2018 | Campbell | G02B 5/08 |
| 10,142,496 | B1* | 11/2018 | Rao | H04N 7/14 |
| 10,315,573 | B2 | 6/2019 | Bongwald | |
| 10,661,170 | B2 | 5/2020 | Hariton | |
| 10,744,936 | B1* | 8/2020 | Budhia | B60J 3/04 |
| 11,428,955 | B1* | 8/2022 | Lewis | G02C 7/101 |
| 11,430,198 | B1* | 8/2022 | Dunn | G06T 7/73 |
| 11,615,724 | B2* | 3/2023 | Kunze | G02B 27/0101 345/7 |
| 2010/0253598 | A1* | 10/2010 | Szczerba | G06V 10/806 701/532 |
| 2010/0292886 | A1* | 11/2010 | Szczerba | G01S 13/723 701/31.4 |
| 2011/0052042 | A1* | 3/2011 | Ben Tzvi | G06V 20/56 382/154 |
| 2012/0075168 | A1* | 3/2012 | Osterhout | G06F 3/017 345/8 |
| 2013/0050258 | A1* | 2/2013 | Liu | G06F 3/013 345/633 |
| 2014/0375683 | A1* | 12/2014 | Salter | G06T 19/006 345/633 |
| 2015/0264256 | A1* | 9/2015 | Lehtiniemi | H04N 21/4788 348/143 |
| 2016/0313902 | A1* | 10/2016 | Hill | G06F 3/0482 |
| 2016/0378861 | A1 | 12/2016 | Eledath et al. | |
| 2017/0113641 | A1* | 4/2017 | Thieberger | B60R 21/04 |
| 2018/0165857 | A1* | 6/2018 | Lee | G06F 3/013 |
| 2019/0121522 | A1* | 4/2019 | Davis | G06V 40/28 |
| 2019/0180485 | A1* | 6/2019 | Kim | G06T 11/60 |
| 2020/0073520 | A1* | 3/2020 | Mohan | G06Q 30/0235 |
| 2020/0082576 | A1* | 3/2020 | Lai | G06F 3/013 |
| 2020/0177871 | A1* | 6/2020 | Kim | G09G 3/003 |
| 2022/0244786 | A1* | 8/2022 | Chu | G06F 3/017 |

FOREIGN PATENT DOCUMENTS

| | | |
|---|---|---|
| CN | 106468947 | 3/2017 |
| CN | 106484094 | 3/2017 |
| JP | 6246757 | 12/2017 |
| TW | 201833727 | 9/2018 |
| TW | 201930960 | 8/2019 |
| TW | I668492 | 8/2019 |

* cited by examiner

METHOD, PROCESSING DEVICE, AND DISPLAY SYSTEM FOR INFORMATION DISPLAY

CROSS-REFERENCE TO RELATED APPLICATION

This application claims the priority benefit of U.S. Provisional Application No. 63/175,569, filed on Apr. 16, 2021. The entirety of the above-mentioned patent application is hereby incorporated by reference herein and made a part of this specification.

TECHNICAL FIELD

The invention relates to an information display technology.

DESCRIPTION OF RELATED ART

With the development of image processing technology and spatial positioning technology, the application of transparent displays has gradually received attention. This type of technology allows a display to work with physical objects, is supplemented by related virtual information, and generates an interactive experience according to the needs of a user, so that the information can be presented in a more intuitive way.

However, currently, in the display system applied to vehicles, as the view of the user moves, the amount of information displayed and the display position may change, making it difficult for the virtual-real fusion to provide correct position correspondence. Moreover, the display information of nearby objects appears in a transparent display for such short time that it is difficult to provide users with proper reading time in the virtual-real fusion. Moreover, the distant targets may be blocked, and it is difficult to provide users with proper reading information in the virtual-real fusion.

SUMMARY

The disclosure provides a method, a processing device, and a display system for information display.

In an embodiment of the disclosure, the display system is disposed on a vehicle and includes a light transmissive display, at least one first information extraction device, at least one second information extraction device, and a processing device. The processing device is connected to the display, the first information extraction device, and the second information extraction device. The first information extraction device is configured to extract gaze information of a user in the vehicle. The second information extraction device is configured to extract scene information of a scene outside the vehicle. The processing device is configured to compute a field of view of the user viewing the scene outside the vehicle through the display according to the gaze information and the scene information, generate display information according to the field of view, and display the display information on the display.

In an embodiment of the disclosure, the method for information display is adapted for a display system with a light transmissive display, at least one first information extraction device, at least one second information extraction device, and a processing device. The display system is disposed on a vehicle. The method includes configuring the first information extraction device to extract gaze information of a user in the vehicle, configuring the second information extraction device to extract scene information of a scene outside the vehicle, computing a field of view of the user viewing the scene outside the vehicle through the display according to the gaze information and the scene information, generating display information according to the field of view of the user, and displaying the display information on the display.

In an embodiment of the disclosure, the processing device is disposed on a vehicle and connected to a display, a first information extraction device, and a second information extraction device. The first information extraction device is configured to extract gaze information of a user in the vehicle, and the second information extraction device is configured to extract scene information of a scene outside the vehicle. The processing device includes memory and a processor. The memory is configured to store data. The processor is configured to obtain the gaze information from the first information extraction device, obtain the scene information from the second information extraction device, compute a field of view of the user viewing the scene outside the vehicle through the display according to the gaze information and the scene information, generate display information according to the field of view, and display the display information on the display.

To make the aforementioned more comprehensible, several embodiments accompanied with drawings are described in detail as follows.

DESCRIPTION OF THE EMBODIMENTS

Figure 1:
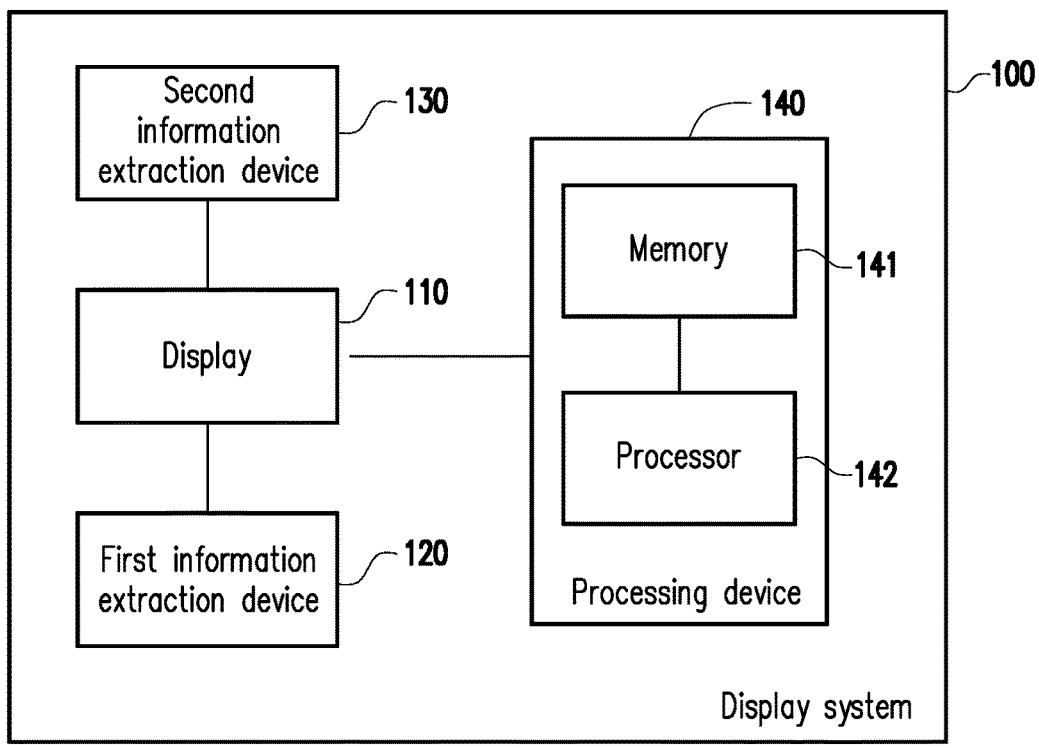
FIG. 1 is a schematic view of a display system according to an embodiment of the disclosure.

Some embodiments of the disclosure will be described in detail with reference to the accompanying drawings. For reference numerals cited in the following descriptions, the same reference numerals appearing in different drawings are regarded as the same or similar elements. The embodiments are only a part of the disclosure and do not disclose all possible implementations of the disclosure. More precisely, the embodiments are merely examples of the method, the device, and the system, FIG. 1 is a schematic view of a display system according to an embodiment of the disclosure. First, in FIG. 1, various elements and configuration relationships in the system are illustrated. Meanwhile, the detailed functions with reference to the flowcharts of the subsequent embodiments are disclosed.

Referring to FIG. 1, a display system 100 in the embodiment can be disposed on a vehicle, such as transportation and entertainment machines. Moreover, the display system 100 includes a display 110, at least one first information extraction device 120, at least one second information extraction device 130, and a processing device 140. The processing device 140 can be electrically connected to the display 110, the first information extraction device 120, and the second information extraction device 130 in a wireless or wired manner.

The display 110 can be configured to display information and, for example, includes a projection type transparent display or a transmissive light transmissive display, such as a liquid crystal display (LCD), a field sequential color LCD, a light emitting diode (LED) display, an electrowetting display, and the like. The display 110 may be a front window (a windshield), a side window, and/or a rear window actually used in a vehicle. The user in the vehicle may view a scene outside the vehicle through the display 110, and the content viewed by the user may be the scene outside the vehicle including superimposed display information.

The first information extraction device 120 is configured to extract gaze information of the user, and the second information extraction device 130 is configured to extract the scene information of a scene outside the vehicle. For example, the first information extraction device 120 may be at least one image sensor or may be at least one image sensor combined with at least one depth sensor to extract the facial image of the user, for example, thereby obtaining the gaze information of the user. That is, as long as it is a device or a combination of devices that can extract the gaze information of the user, it belongs to the category of the first information extraction device 120. For example, the second information extraction device 130 may be at least one image sensor to extract images of the scene outside the vehicle of the display 110 or may be a GPS locator or radar to locate objects in the scene outside the vehicle of the display 110, for example. That is, as long as it is a device or a combination of devices that extracts the scene information of the scene outside the vehicle of the display 110, it belongs to the category of the second information extraction device 130.

The processing device 140 is configured to control the operation of the display system 100 and includes memory 141 and a processor 142. For example, the memory 141 may be any type of fixed or removable random access memory (RAM), read-only memory (ROM), flash memory, hard disks or other similar devices, integrated circuits, and a combination thereof. For example, the processor 142 may be a central processing unit (CPU) or an application processor (AP), or other programmable general-purpose or special-purpose microprocessors, a digital signal processor (DSP), an image signal processor (ISP), a graphics processing unit (GPU), or other similar devices, integrated circuits, and a combination thereof. With reference to the elements of the display system 100, the details of the process of the method for information display executed by the processing device 140 are illustrated in the following embodiments.

Figure 2:
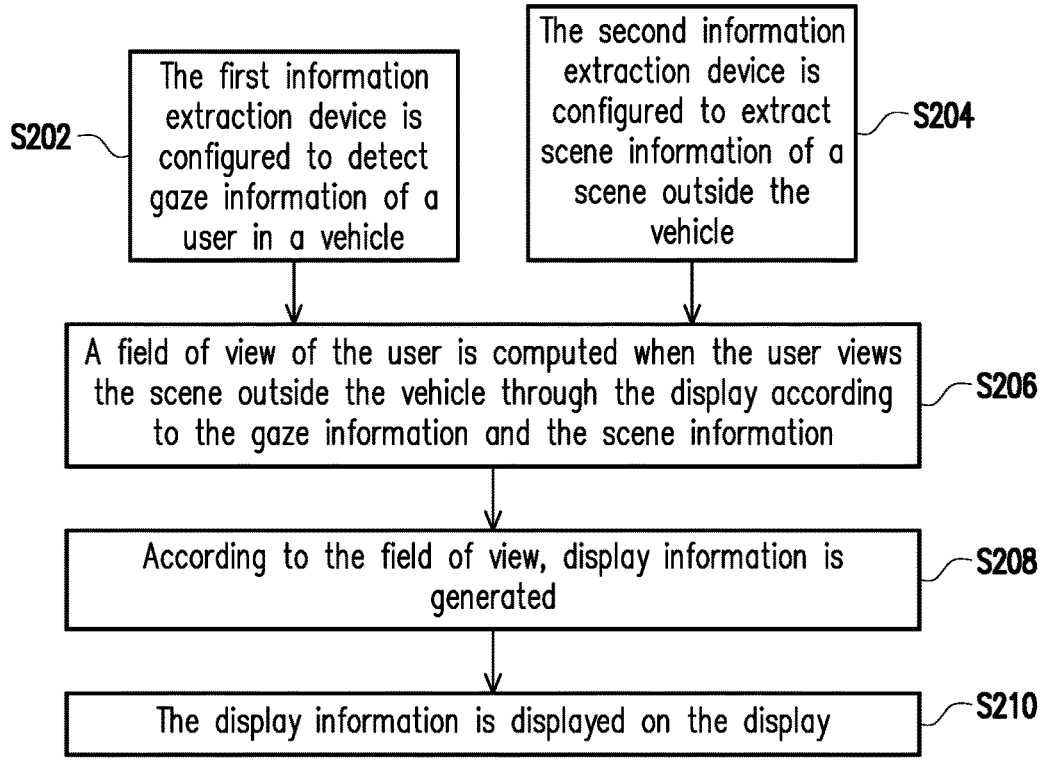
FIG. 2 is a flowchart illustrating a method for information display according to an embodiment of the disclosure.

FIG. 2 is a flowchart illustrating a method for information display according to an embodiment of the disclosure, and the process of the method in FIG. 2 can be implemented by the display system 100 of FIG. 1, for example. Meanwhile, the user in the vehicle can view a scene outside the vehicle and the related information through the display 110 of the display system 100.

Referring to both FIG. 1 and FIG. 2, first, the processing device 140 of the display system 100 uses the first information extraction device 120 to extract the gaze information of the user (step S202), and the second information extraction device 130 is configured to extract the scene information of a scene outside the vehicle (step S204). As mentioned, for example, the first information extraction device 120 may be an image sensor, a depth sensor, and a combination thereof that can extract the gaze information of the user in the vehicle; and for example, the second information extraction device 130 may be an image sensor, a GPS locator, a radar, and a combination thereof that can extract scene information of a scene outside the vehicle. The specific configuration is illustrated in each of the subsequent embodiments.

Next, the processing device 140 may compute a field of view of the user viewing the scene outside the vehicle through the display 110 according to the gaze information and the scene information (step S206), then according to the field of view of the user, display information is generated (step S208), and the display information is displayed on the display 110 (step S210). That is, the processing device 140 can compute the view of the user when viewing through the display 110 in real time according to the view of the user to generate and display the corresponding display information on the display 110, which can greatly reduce the amount of computing required to display related information of all scenes outside the vehicle. Meanwhile, the display information may be guide information of the scene outside the vehicle, virtual interactive objects, etc., and the disclosure is not limited thereto.

For the sake of clarity, in the following embodiments, with reference to different application scenarios of the display system 100, the details of the process in FIG. 2 are specifically illustrated. In the following embodiments, the first information extraction device 120 may be implemented as an image sensor, and the second information extraction device 130 may be implemented as an image sensor or a GPS locator. However the disclosure is not limited thereto.

Figure 3A:
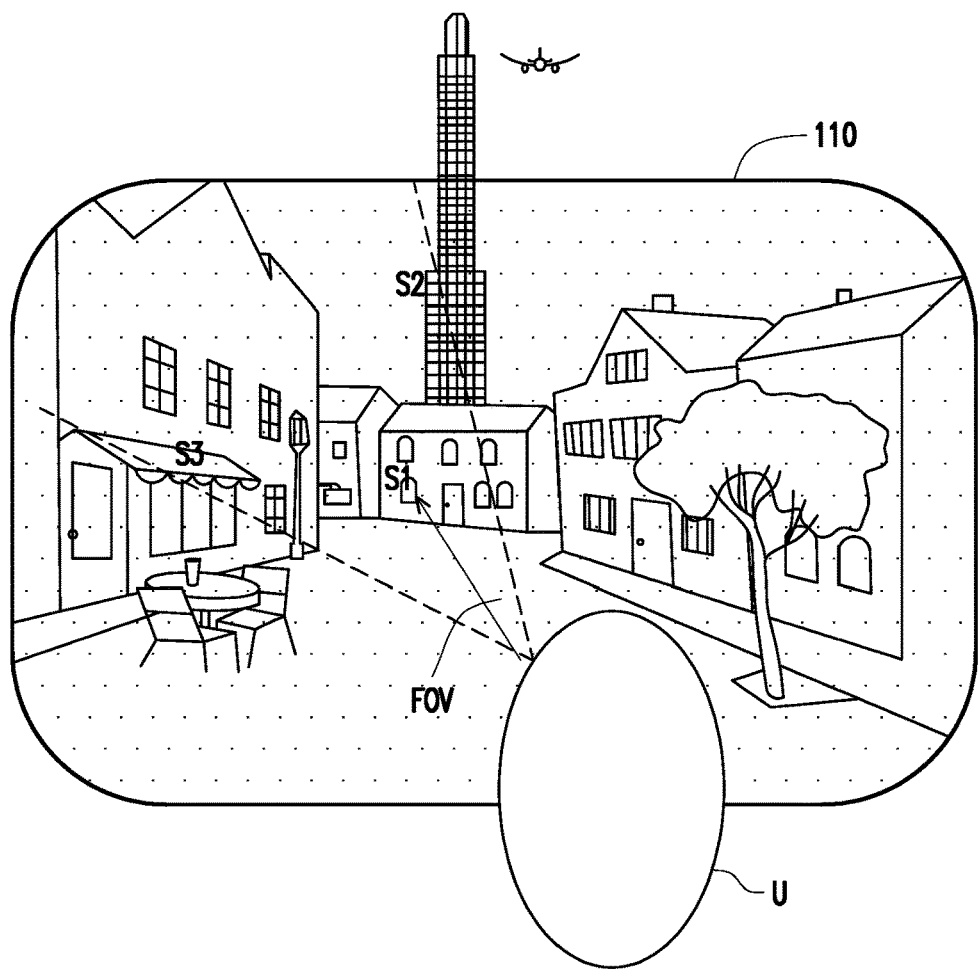
FIG. 3A and FIG. 3B are schematic views of application scenarios of a display system according to an embodiment of the disclosure.
Figure 3B:
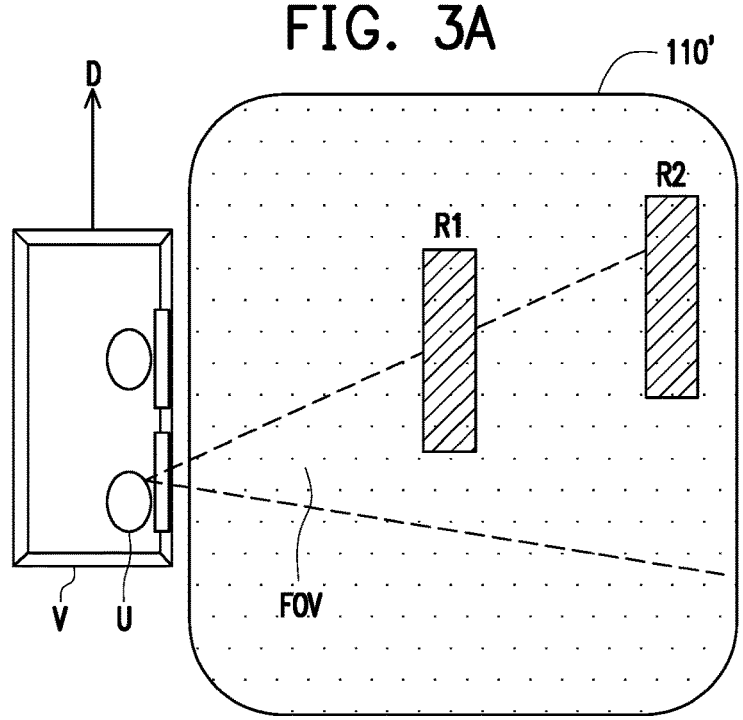
Figure 4:
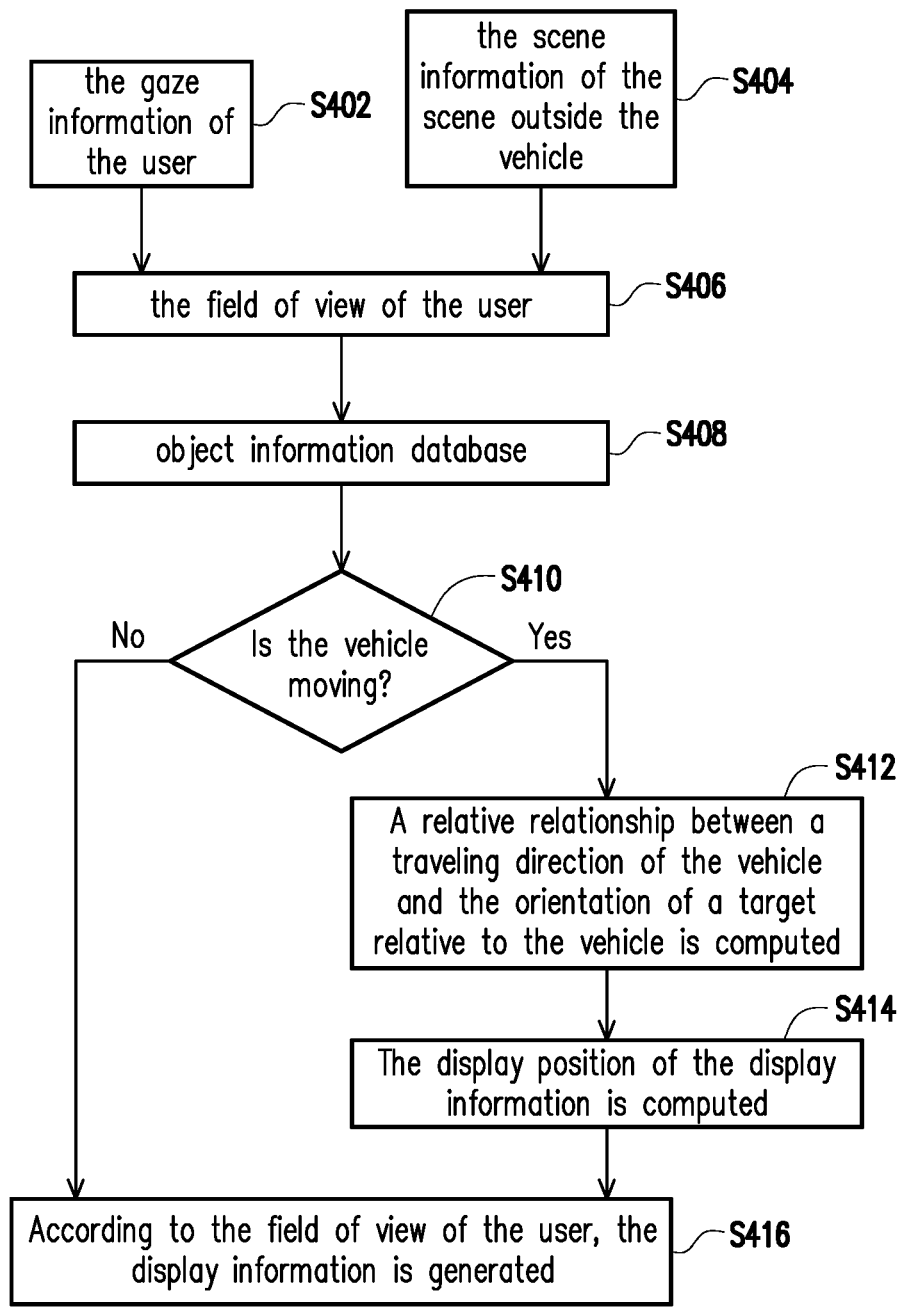
FIG. 4 is a flowchart illustrating a method for information display according to an embodiment of the disclosure.

FIG. 3A and FIG. 3B are schematic views of application scenarios of a display system according to an embodiment of the disclosure, and FIG. 4 is a flowchart illustrating a method for information display according to an embodiment of the disclosure.

Referring to FIG. 1, FIG. 3A, FIG. 3B, and FIG. 4 altogether, in the embodiment, the display 110 of the display system 100 may be implemented as a side window of a vehicle V, and a user U may view a scene outside the vehicle V through the display 110. In the embodiment, the processing device 140 of the display system 100 may obtain the gaze information of the user U through an image sensor (not shown) (step S402) and obtain the scene information of the scene outside the vehicle with V through the image sensor or a GPS locator (step S404). Meanwhile, the processing device 140 estimate the gaze information of the user U by using the facial image of the user extracted by the image sensor by any applicable eye tracking algorithm. Moreover, the processing device 140 can perform scene analysis to obtain scene information by using the image of the scene outside the vehicle extracted by the image sensor, or locate the position of the vehicle V through a GPS locator, and further estimate the scene information.

Next, the processing device 140 may compute the field of view FOV of the user U viewing the scene outside the vehicle V through the display 110 in the vehicle V according to the gaze information of the user U and the scene information of the scene outside the vehicle V (step S406) and load the target-related information of the field of view FOV from an object information database (step S408). Meanwhile, the object information database can be stored in the memory 141 or obtained from a cloud server through a communication interface (not shown). For example, assuming that the targets in the field of view FOV of the user include a scenic spot S1, a scenic spot S2, and a scenic spot S3, the related information may be the guide information of the scenic spots S1 to S3. Assuming that the scenic spot S1 is a historical site, the related information can be a historical profile of the historical site. Assuming that the scenic spots S2 and S3 are stores, the related information can be store profile, business hours, reviews, and so on.

Next, the processing device 140 may determine whether the vehicle V is moving (step S410). When the processing device 140 determines that the vehicle V is moving, the processing device 140 may compute the relative relationship between the traveling direction D of the vehicle V and the orientation of the target relative to the vehicle V (step S412) to compute the display position of the display information on the display 110 (step S414), and then according to the field of view FOV of the user, the display information is generated (step S416). Meanwhile, the display position computed based on the gaze information of the user, the field of view FOV, and the relative relationship between the vehicle V and the target can reduce the frequency of changes in the display information, and when the user U is viewing a scene outside the vehicle, the problem of motion sickness or eye fatigue caused by the vibration or movement of the vehicle V and the parallax of the user U is improved. On the other hand, when the processing device 140 determines that the vehicle V is not moving, step S416 is executed directly to generate display information according to the field of view FOV of the user.

Specifically, the processing device 140 can compute the viewing field of the user U based on the viewing position of the user U in real time and then display different information or interact in the viewing field of the user U according to the change of the viewing field. Taking FIG. 3B as an example, assuming that 110' is the display space of the display 110, related information R1 corresponding to the scenic spot S1 and related information R2 corresponding to the scenic spot 2 may be displayed.

Figure 5A:
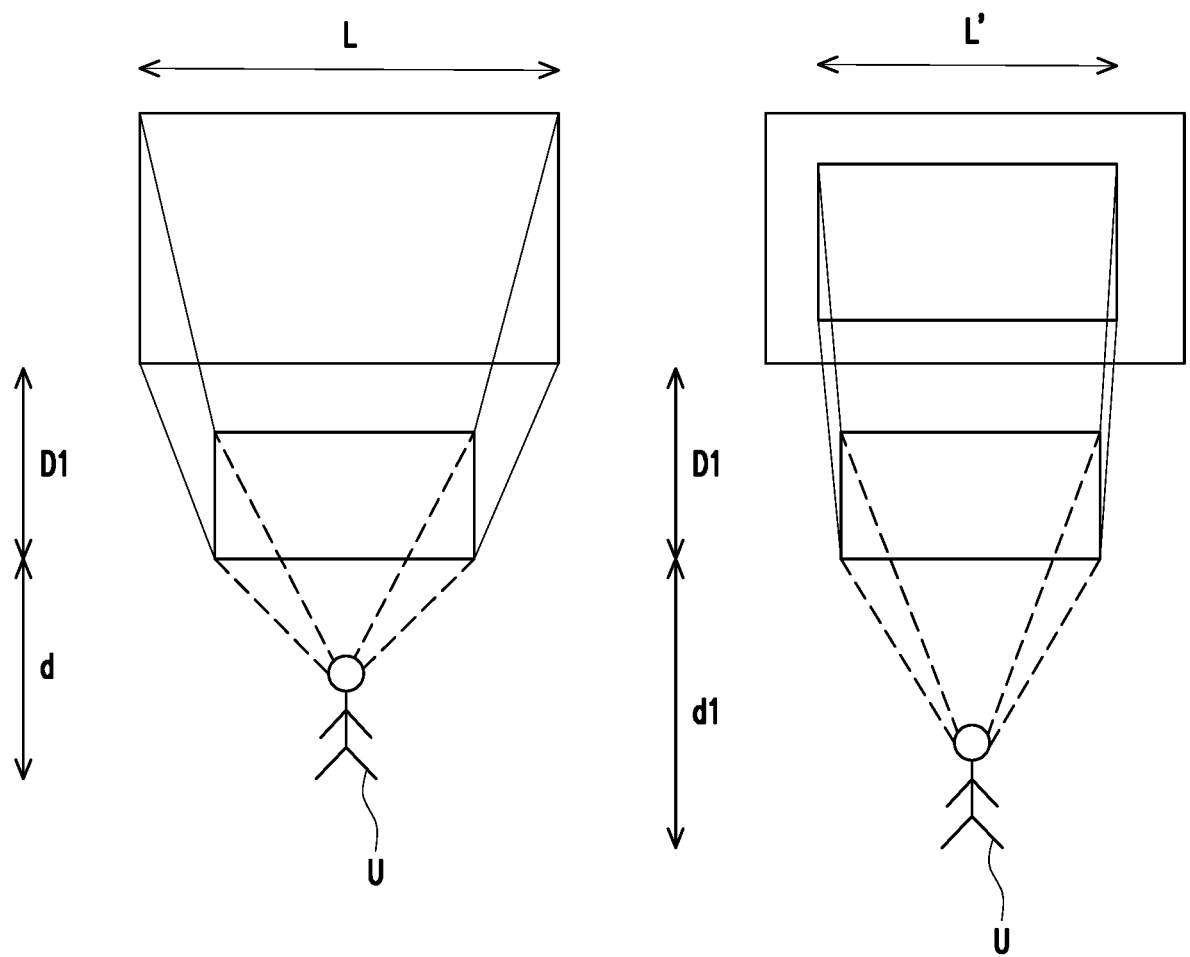
FIG. 5A to FIG. 5C are schematic views of a method for computing a display position of display information according to an embodiment of the disclosure.
Figure 5B:
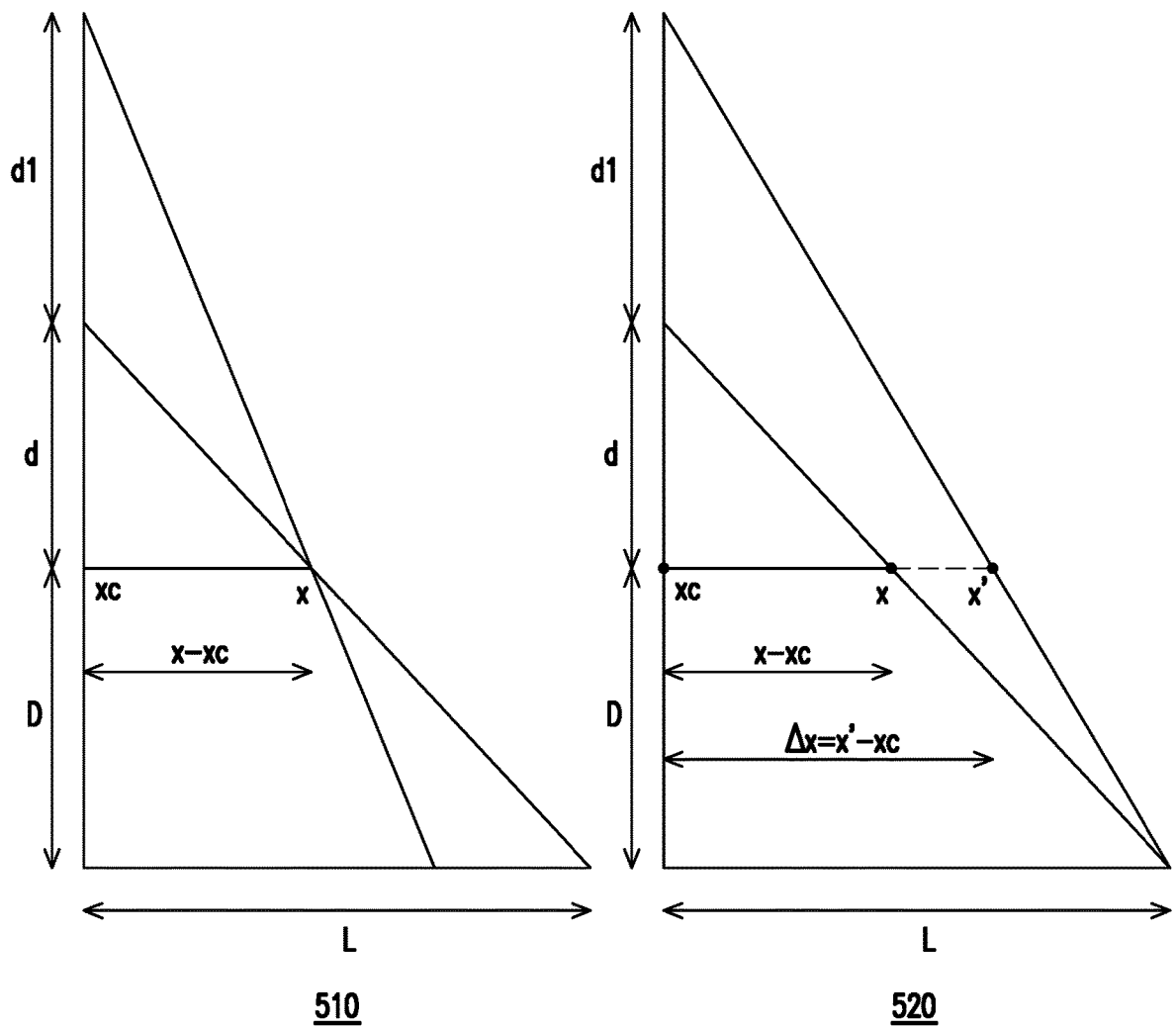
Figure 5C:
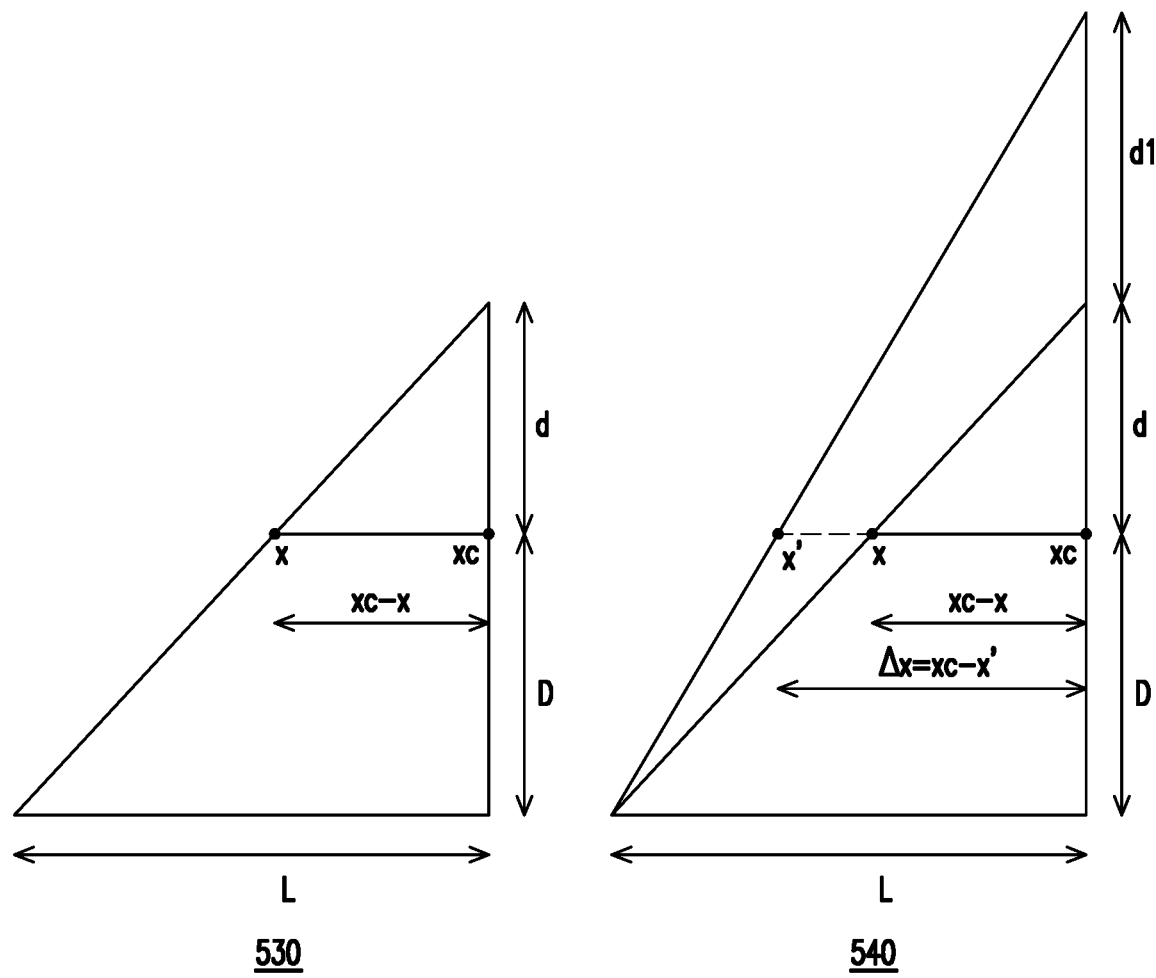

Specifically, FIG. 5A to FIG. 5C are schematic views of a method for computing a display position of display information according to an embodiment of the disclosure.

Referring to both FIG. 1 and FIG. 5A, D1 is the distance between the display 110 and the target, d is the distance between the eyes of the user U and the display 110, L is the maximum field of view that can be viewed by the user U at this distance relationship, dl is the distance between the eyes of the user U after moving backward and the display 110, and meanwhile the field of view that the user U can view may be reduced to U. Assuming that x is the original display position of the display information in the X direction, xc is the center of the display 110 in the X direction, and x' is the display position of the display information in the X direction after the user U moves backward, where x' can be derived from the proportional relationship of the triangle.

In detail, assuming that PNum is the total number of the displays in the X direction, taking FIG. 5B as an example, when $$x > \frac{(PNum)x}{2},$$

the relations can be derived from triangle 510 and triangle 520, respectively as follows.

$$\begin{cases} \frac{x-xc}{L} = \frac{d}{d+D} \Rightarrow x-xc = \left(\frac{d}{d+D}\right)L \\ \frac{\Delta x}{L} = \frac{d1}{d1+D} \Rightarrow \Delta x = \left(\frac{d1}{d1+D}\right)L \end{cases} \Rightarrow \frac{\Delta x}{x-xc} = \left(\frac{d+D}{d1+D}\right)\left(\frac{d1}{d}\right)$$

That is, when x>xc, the display position x' is expressed as equation (1):

$$x' = xc + \frac{d1(d+D1)(x-xc)}{d(d1+D1)} \qquad (1)$$

Taking FIG. 5C as an example, when $$x < \frac{(PNum)x}{2},$$

the relations can be derived from triangles 530 and 540, respectively as follows.

$$\begin{cases} \frac{xc-x}{L} = \frac{d}{d+D} \Rightarrow xc-x = \left(\frac{d}{d+D}\right)L \\ \frac{\Delta x}{L} = \frac{d1}{d1+D} \Rightarrow \Delta x = \left(\frac{d1}{d1+D}\right)L \end{cases} \Rightarrow \frac{\Delta x}{xc-x} = \left(\frac{d+D}{d1+D}\right)\left(\frac{d1}{d}\right)$$

That is, when x<xc, the display position x' is expressed as equation (2):

$$x' = xc - \frac{d1(d+D1)(xc-x)}{d(d1+D1)} \qquad (2)$$

Therefore, for the same target (hereinafter referred to as the "first target"), when the user views the first target in the first field of view, the processing device 140 may set the first related information in the related information of the first target as display information. When the user views the first target in the second field of view, the processing device 140 may set the second related information in the related information of the first target as display information. Meanwhile, the first field of view is different from the second field of view, and the first related information may be different from the second related information.

For example, when the viewing distance of the user relative to the first target is the first distance, the processing device 140 may set the first related information in the related information of the first target as the display information. When the viewing distance of the user relative to the first target is the second distance, the processing device 140 may set the second related information in the related information of the first target as display information. Meanwhile, the first distance is less than the second distance, and the information amount of the first related information is greater than the information amount of the second related information. That is, when the distance between the user and the first target is close, the first target may have a larger area of the field of view in the field of view of the user, and meanwhile the display 110 can display more display information belonging to the information amount of the first target. When the distance between the user and the first target is far, the first target may have a smaller area of field of view in the field of view of the user U, and the display 110 may display less display information of the information amount of the first target.

For example, when the viewing orientation of the user relative to the first target is the first orientation, the processing device 140 may set the first related information in the related information of the first target as the display information. When the viewing orientation of the user relative to the first target is the second orientation, the processing device 140 may set the second related information in the related information of the first target as the display information. Meanwhile, the first orientation is different from the second orientation, and the first related information may be different from the second related information. Specifically, when the user U views from a lower position, the display 110 can display more low information belonging to the first target. When the user U views from an upper position, the display 110 can display more upper information belonging to the first target. When the user U views from a position farther to the left, the display 110 can display more left information belonging to the first target. When the user U views from a position farther to the right, the display 110 can display more right information belonging to the first target. When the user U views from a position that is tilted or from a side, the display 110 can also display corresponding display information.

Figure 6:
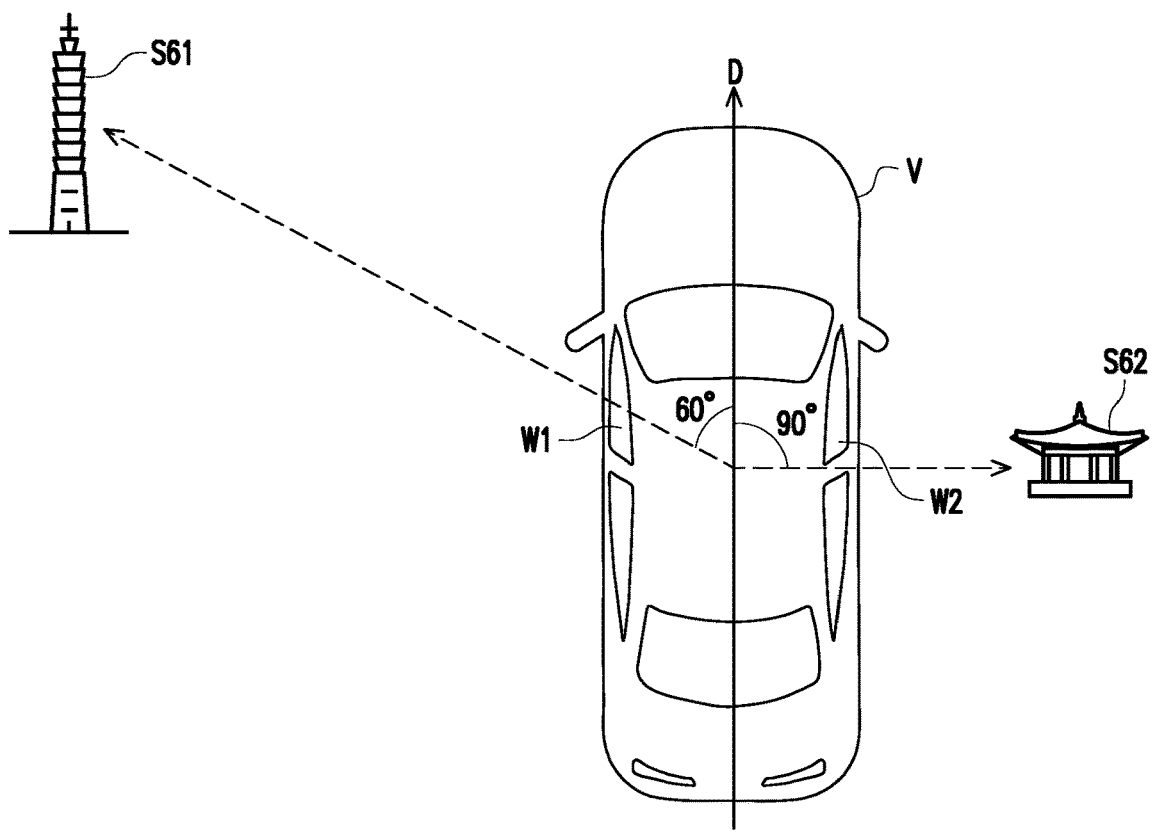
FIG. 6 is a schematic view of an application scenario of the display system according to an embodiment of the disclosure.

FIG. 6 is a schematic view of an application scenario of the display system according to an embodiment of the disclosure.

Referring to both FIG. 1 and FIG. 6, in the embodiment, the vehicle V may have multiple windows W1 and W2 implemented as the display 110, and when the vehicle V moves in the traveling direction D, the processing device 140 can further determine which window to display the information on. The processing device 140 may first determine the location of the target by image recognition, and then determine according to the relative relationship (e.g., the included angle) between the traveling direction of the vehicle V and the direction of the target relative to the vehicle V. For example, when the included angle is within the range (e.g., 10° to) 170° of the first included angle, the processing device 140 may display the display information on the left window W1, and when the included angle is within the range (e.g., −170° to −10°) of the second included angle, the processing device 140 may display the display information on the right window W2. In the embodiment, the included angle between a scenic spot S61 and the traveling direction D of the vehicle V is 60°, and the processing device 140 can display the display information of the scenic spot S61 on the left window W1. The included angle between a scenic spot S62 and the traveling direction D of the vehicle V is −90°, and the processing device 140 can display the display information of the scenic spot S62 on the right window W2.

Figure 7:
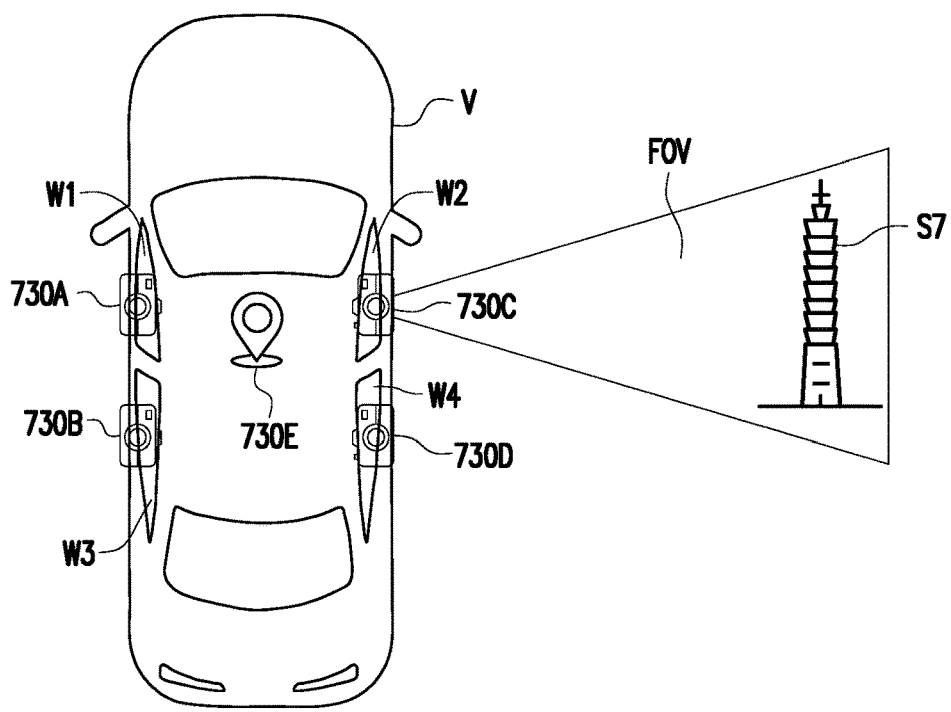
FIG. 7 is a schematic view of an application scenario of the display system according to an embodiment of the disclosure.

FIG. 7 is a schematic view of an application scenario of the display system according to an embodiment of the disclosure.

Referring to both FIG. 1 and FIG. 7, in the embodiment, the vehicle V may have a plurality of vehicle windows W1 to W4 implemented as the display 110, and image sensors 730A to 730D are respectively disposed thereon to extract a scene outside the vehicle V. When the vehicle V is moving, the processing device 140 can determine the initial position of the scenic spot S7 first through a GPS locator 730E, the image sensor 730C is further configured for image recognition, and the exact position of the scenic spot S7 can be determined more accurately.

Figure 8A:
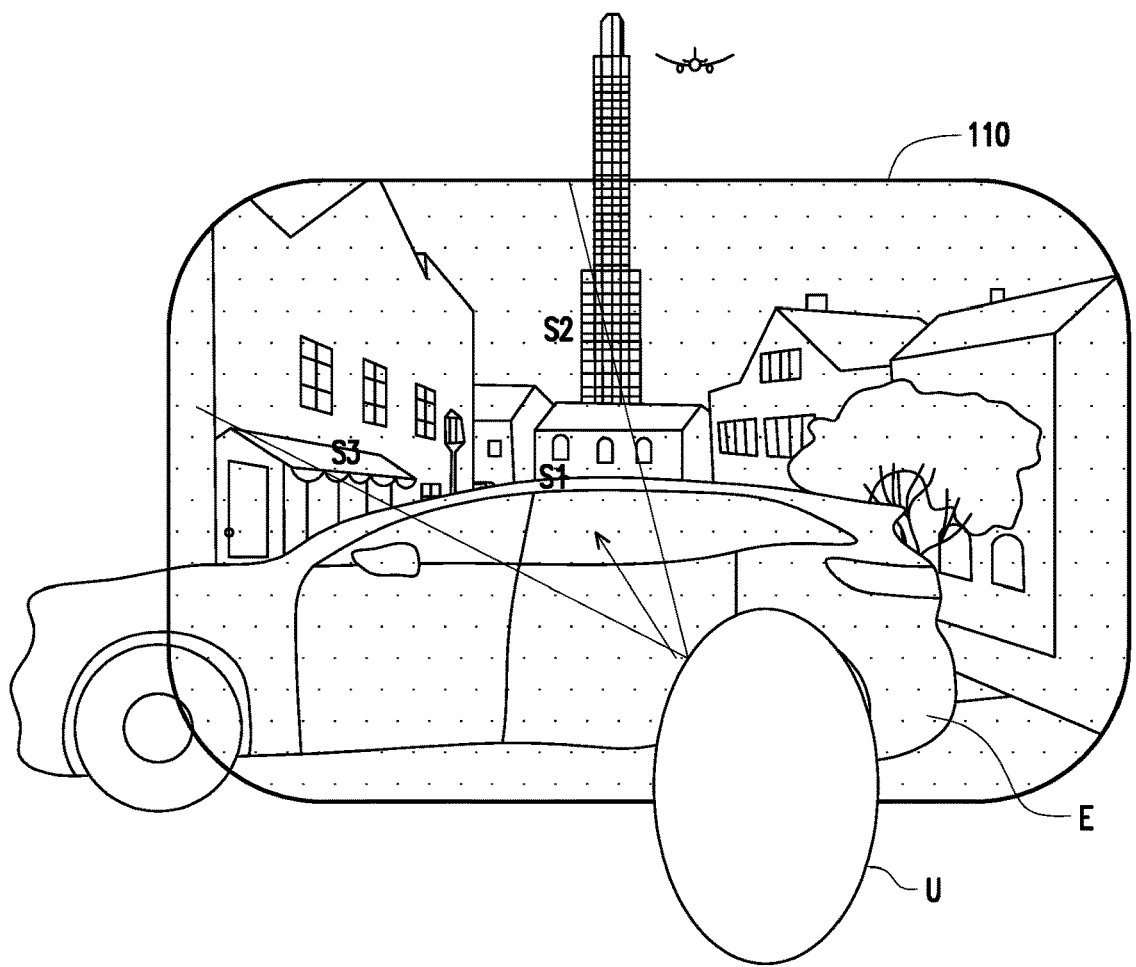
FIG. 8A and FIG. 8B are schematic views of application scenarios of the display system according to an embodiment of the disclosure.
Figure 8B:
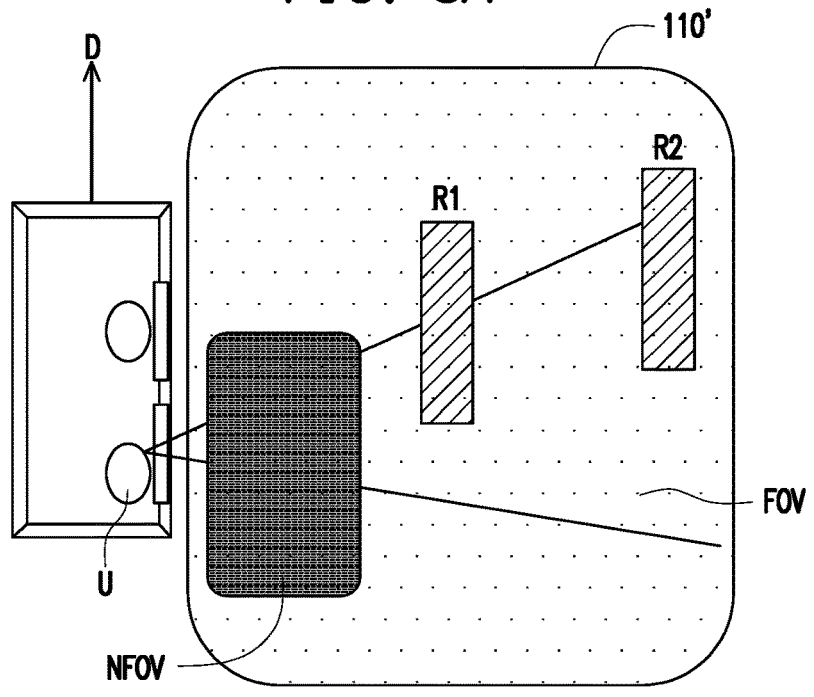

FIG. 8A and FIG. 8B are schematic views of application scenarios of the display system according to an embodiment of the disclosure.

Referring to FIG. 1, FIG. 8A, and FIG. 8B altogether, in the embodiment, assuming that when the user U is viewing the target (e.g., the scenic spot S1), it is interfered or blocked by other objects (e.g., a vehicle E in the next lane). The processing device 140 can generate display information (e.g., pictures, text descriptions, or images of the blocked area of the scenic spot S1) according to the related information of the scenic spot S1, and the display information of the scenic spot S1 can be superimposed on the display 110 corresponding to the position of the vehicle E, which helps to overcome the problem of the target being too far away or being blocked.

Moreover, the processing device 140 can obtain the current image including the scenic spot S1 from the image sensor and the previous image sorted before the current image to perform a comparison to determine whether the ratio of the feature size of the scenic sport S1 in the current image to the feature size of the scenic spot S1 in the previous image is greater than or equal to a preset threshold, and meanwhile the preset threshold can be any value between 0.1 and 1, for example. When the ratio of the feature size of the scenic sport S1 in the current image to the feature size of the scenic spot S1 in the previous image is greater than the preset threshold, it means that the area of the blocked scenic spot S1 may become smaller and smaller, and the processing device 140 can display the display information of the scenic spot S1 on the display 110. On the other hand, when the ratio of the feature size of the scenic sport S1 in the current image to the feature size of the scenic spot S1 in the previous image is less than the preset threshold, it means that the area of the blocked scenic spot S1 may become larger and larger, and the processing device 140 may choose not to display the display information of the scenic spot S1 on the display 110. In the embodiment, under the premise that there is a blocked area NFOV in the field of view FOV, the processing device 140 can still display the related information R1 corresponding to the scenic spot 1 and the related information R2 corresponding to the scenic spot 2.

Figure 9:
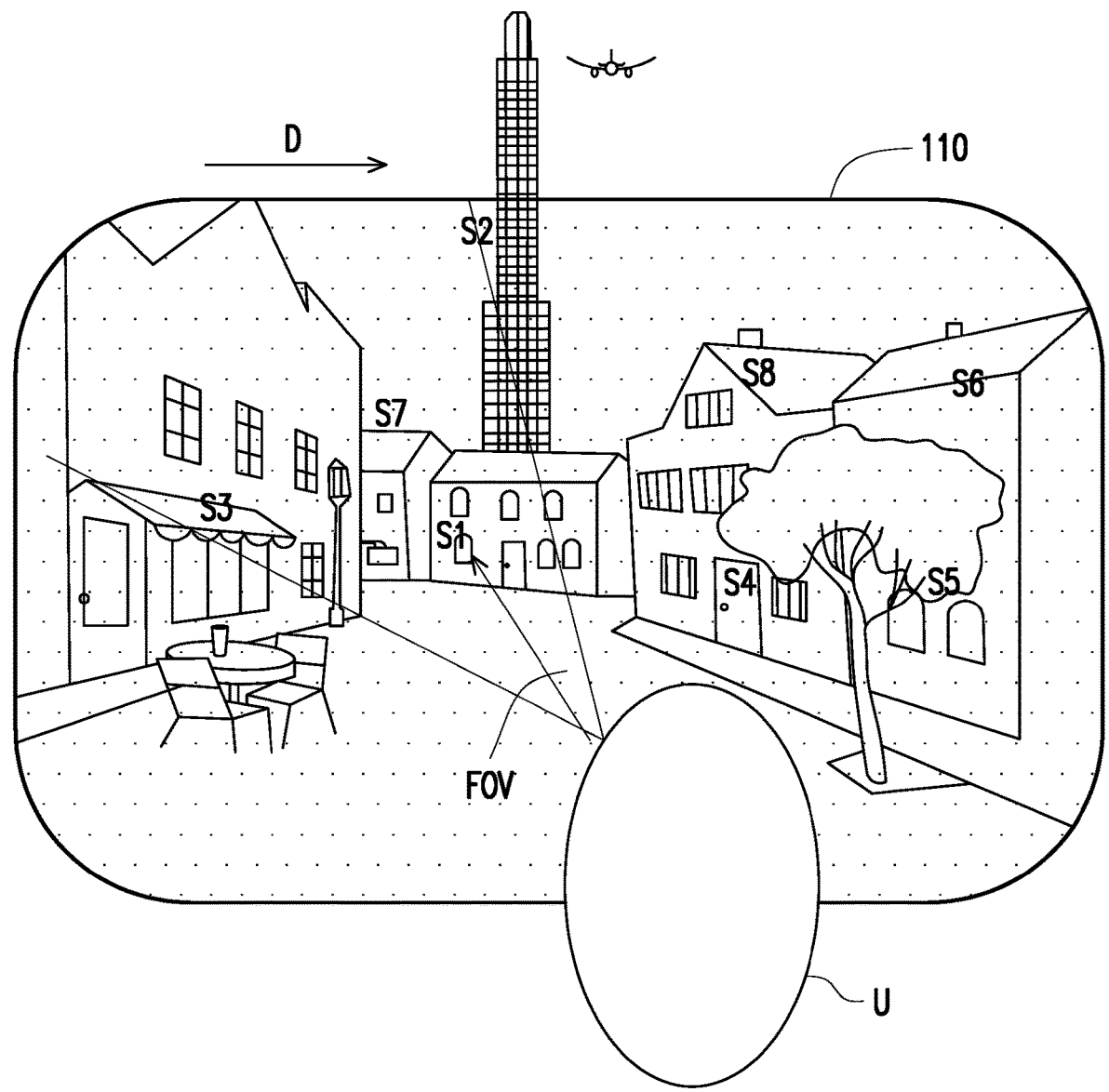
FIG. 9 is a schematic view of an application scenario of the display system according to an embodiment of the disclosure.

FIG. 9 is a schematic view of an application scenario of the display system according to an embodiment of the disclosure.

Referring to both FIG. 1 and FIG. 9, in the embodiment, when the field of view FOV of the user includes too many targets, to prevent too much information from resulting in the viewing difficulties of the user U, the processing device 140 can pre-obtain the type of targets in which the user is interested. When the number of targets is greater than a preset number, the processing device 140 only obtains related information of the target in which the user U is interested from the object information database to generate display information. Meanwhile, the field of view FOV of the user U includes four scenic spots S1 to S3 and S7. Assuming that the preset number is 3, when the scenic spot S7 is not a target in which the user U is interested, the related information of the scenic spot S7 may not be displayed.

Moreover, in an embodiment, the processing device 140 preloads the object information from the object information database based on the traveling direction D of the vehicle, and within the field of view FOV of the user U, information is displayed according to the type in which the user is interested, so as to overcome factors, such as the short distance between the vehicle and the object, leading the information to change too fast and causing the problem of insufficient system response time and/or the problem that the user cannot view. For example, assuming that the scenic spots S4 to S6 and S8 are nearby scenic spots in the traveling direction D, the processing device 140 may pre-load related information of the scenic spots S4 to S6 and S8.

In another embodiment, the processing device 140 can condense and lock the display information in the field of view FOV of the user when the vehicle is moving, so as to prevent the display information from drifting accordingly resulting from the head turning or eye moving of the user to improve the readability of the display information. Moreover, for the condensed and locked display information, the user U can further interact with the condensed and locked information by means of voice recognition, gesture operation, panel touch, and hybrid control (e.g., brain waves).

The method, the processing device, and the display system for information display proposed in the embodiments of the disclosure can compute a field of view of a user viewing through the display according to the view of the user in real time, corresponding display information is generated and displayed on the display, and this can greatly enhance the viewing experience of the user in a vehicle.

Although the disclosure has been described with reference to the above embodiments, they are not intended to limit the disclosure. It will be apparent to one of ordinary skill in the art that modifications and changes to the described embodiments may be made without departing from the spirit and the scope of the disclosure. Accordingly, the scope of the disclosure will be defined by the attached claims and their equivalents and not by the above detailed descriptions.

What is claimed is:

1. A display system, disposed on a vehicle, comprising:
a light transmissive display;
at least one first information extraction device configured to extract gaze information of a user in the vehicle;
at least one second information extraction device configured to extract scene information of a scene outside the vehicle;
a processing device connected to the display, the first information extraction device, and the second information extraction device and configured to:
according to the gaze information and the scene information, compute a field of view of the user viewing the scene outside the vehicle through the display;
according to the field of view, generate display information; and
display the display information on the display,
wherein the field of view comprises at least one target, and the processing device obtains related information of each target from an object information database and accordingly generates the display information,
wherein the object information database comprising a profile that is associated with the related information of the at least one target,
wherein the target comprises a first target, the related information comprises a first related information and a second related information associated with a viewing distance, the field of view, or a viewing orientation, and the processing device sets the first related information in the related information of the first target as the display information,
wherein the processing device is further configured to:
when the first target is blocked by other objects, generate first display information according to the related information of the first target;
display the first display information on the display, wherein the first display information is superimposed on the other objects,
wherein the second information extraction device comprises an image sensor, and the processing device is further configured to:
obtain a current image and a previous image of the first target, wherein the previous image is sorted before the current image;
determine whether a ratio of a feature size of the first target in the current image to a feature size of the first target in the previous image is greater than a preset threshold;
when the ratio is greater than or equal to the preset threshold, display the first display information on the display; and
when the ratio is less than the preset threshold, not display the first display information on the display.

2. The display system according to claim 1, wherein the first information extraction device comprises an image sensor.

3. The display system according to claim 1, wherein the second information extraction device comprises a locator.

4. The display system according to claim 1, wherein the second information extraction device comprises an image sensor and a locator.

5. The display system according to claim 1, wherein:
when the user views the first target in a first field of view, the processing device sets the first related information in the related information of the first target as the display information; and
when the user views the first target in a second field of view, the processing device sets the second related information in the related information of the first target as the display information, wherein the first field of view is not equal to the second field of view, and the first related information is different from the second related information.

6. The display system according to claim 1, wherein:
when a viewing distance of the user relative to the first target is a first distance, the processing device sets the first related information in the related information of the first target as the display information; and
when the viewing distance of the user relative to the first target is a second distance, the processing device sets the second related information in the related information of the first target as the display information, wherein the first distance is less than the second distance, and an information amount of the first related information is greater than or equal to an information amount of the second related information.

7. The display system according to claim 1, wherein:
when a viewing orientation of the user relative to the first target is a first orientation, the processing device sets the first related information corresponding to the first orientation in the related information of the first target as the display information; and when the viewing orientation of the user relative to the first target is a second orientation, the processing device sets the second related information corresponding to the second orientation in the related information of the first target as the display information.

8. The display system according to claim 1, wherein the processing device is further configured to:
    determine whether the vehicle is moving; and
    generate the display information according to the field of view and the related information of each target when it is determined that the vehicle is not moving.

9. The display system according to claim 1, wherein the processing device is further configured to:
    determine whether the vehicle is moving; and
    compute a relative relationship between a traveling direction of the vehicle and an orientation of each target relative to the vehicle when it is determined that the vehicle is moving;
    compute a display position of the display information on the display according to the relative relationship; and
    generate the display information according to the display position, the field of view, and the related information of each target.

10. The display system according to claim 9, wherein the vehicle further comprises another light transmissive display, and the processing device is further configured to:
    set the display information to be displayed on either the display or the another display according to the relative relationship.

11. The display system according to claim 10, wherein:
    when the relative relationship is a first included angle and the first included angle is within a range of the first included angle, the processing device sets the display information to be displayed on the display; and
    when the relative relationship is a second included angle and the second included angle is within a range of the second included angle, the processing device sets the display information to be displayed on the another display, wherein the range of the first included angle is not overlapped with the range of the second included angle.

12. The display system according to claim 1, wherein there is at least one nearby target outside the field of view, and the processing device is further configured to:
    obtain the related information of the nearby target from the object information database.

13. The display system according to claim 1, wherein the processing device generates the display information according to the display position, the field of view range, and information in which the user is interested in the related information of each target.

14. The display system according to claim 1, wherein when a number of the target is greater than a preset number, the processing device obtains the related information of a target in which the user is interested from the object information database and accordingly generates the display information.

15. The display system according to claim 1, wherein the processing device is further configured to:
    when each target is located in the field of view, the display information of each target is condensed and locked on the display.

16. A method for information display adapted for a display system with a light transmissive display, at least one first information extraction device, at least one second information extraction device, and a processing device, wherein the display system is disposed on a vehicle, and the method comprises:
    configuring the first information extraction device to extract gaze information of a user in the vehicle;
    configuring the second information extraction device to extract scene information of a scene outside the vehicle;
    according to the gaze information and the scene information, computing a field of view of the user viewing the scene outside the vehicle through the display;
    according to the field of view, generating display information; and
    displaying the display information on the display,
    wherein the field of view comprises at least one target, and the method further comprising:
    obtaining related information of each target from an object information database and accordingly generating the display information, wherein the object information database comprising a profile that is associated with the related information of the at least one target, wherein the target comprises a first target, the related information comprises a first related information and a second related information associated with a viewing distance, the field of view, or a viewing orientation; and
    setting the first related information in the related information of the first target as the display information,
    wherein the method further comprising:
    when the first target is blocked by other objects, generating first display information according to the related information of the first target;
    displaying the first display information on the display, wherein the first display information is superimposed on the other objects,
    wherein the second information extraction device comprises an image sensor, and the method further comprising:
    obtaining a current image and a previous image of the first target, wherein the previous image is sorted before the current image;
    determining whether a ratio of a feature size of the first target in the current image to a feature size of the first target in the previous image is greater than a preset threshold;
    when the ratio is greater than or equal to the preset threshold, displaying the first display information on the display; and
    when the ratio is less than the preset threshold, not displaying the first display information on the display.

17. A processing device disposed on a vehicle and connected to a light transmissive display, at least one first information extraction device, and at least one second information extraction device, wherein the first information extraction device is configured to extract gaze information of a user in the vehicle, the second information extraction device is configured to extract scene information of a scene outside the vehicle, and the processing device comprises:
    memory configured to store data; and
    a processor configured to:
        obtain the gaze information from the first information extraction device;
        obtain the scene information from the second information extraction device;
        according to the gaze information and the scene information, compute a field of view of the user viewing the scene outside the vehicle through the display;

according to the field of view, generate display information; and display the display information on the display, wherein the field of view comprises at least one target, and the processor is further configured to:

obtain related information of each target from an object information database and accordingly generate the display information, wherein the object information database comprising a profile that is associated with the related information of the at least one target, wherein the target comprises a first target, the related information comprises a first related information and a second related information associated with a viewing distance, the field of view, or a viewing orientation; and set the first related information in the related information of the first target as the display information, wherein the processor is further configured to:

when the first target is blocked by other objects, generate first display information according to the related information of the first target;

display the first display information on the display, wherein the first display information is superimposed on the other objects, wherein the second information extraction device comprises an image sensor, and the processor is further configured to:

obtain a current image and a previous image of the first target, wherein the previous image is sorted before the current image;

determine whether a ratio of a feature size of the first target in the current image to a feature size of the first target in the previous image is greater than a preset threshold;

when the ratio is greater than or equal to the preset threshold, display the first display information on the display; and when the ratio is less than the preset threshold, not display the first display information on the display.

* * * * *